(12) United States Patent
Miller et al.

(10) Patent No.: US 11,709,053 B2
(45) Date of Patent: *Jul. 25, 2023

(54) POINT DETERMINATION AND PROJECTION DEVICE

(71) Applicant: Groove Unlimited, LLC, Taneytown, MD (US)

(72) Inventors: Michael J. Miller, Bethesda, MD (US); Leonard Jay Wantz, Taneytown, MD (US)

(73) Assignee: Groove Unlimited, LLC, Taneytown, MD (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/221,970

(22) Filed: Apr. 5, 2021

(65) Prior Publication Data

US 2021/0223043 A1 Jul. 22, 2021

Related U.S. Application Data

(63) Continuation of application No. 16/165,652, filed on Oct. 19, 2018, now Pat. No. 10,969,223.

(60) Provisional application No. 62/574,508, filed on Oct. 19, 2017.

(51) Int. Cl.
*G01C 15/00* (2006.01)
*G01C 1/00* (2006.01)

(52) U.S. Cl.
CPC .............. *G01C 15/004* (2013.01); *G01C 1/00* (2013.01); *G01C 15/00* (2013.01); *G01C 15/008* (2013.01)

(58) Field of Classification Search
None
See application file for complete search history.

(56) References Cited

U.S. PATENT DOCUMENTS

| | | | | |
|---|---|---|---|---|
| 5,493,786 A | * | 2/1996 | Thomson | G01C 15/002 33/1 G |
| 6,453,568 B1 | * | 9/2002 | Hymer | G01C 15/008 33/278 |
| 9,448,059 B2 | * | 9/2016 | Bridges | H04N 13/275 |
| 10,027,937 B1 | * | 7/2018 | Staton | H04N 9/3185 |
| 10,900,781 B2 | * | 1/2021 | Sullivan | G01C 15/002 |
| 10,969,223 B2 | * | 4/2021 | Miller | G01C 1/00 |

(Continued)

*Primary Examiner* — Christopher W Fulton
(74) *Attorney, Agent, or Firm* — Gregory M. Stone; Whiteford, Taylor & Preston LLP (57) ABSTRACT

Disclosed herein is a point determination and projection device configured to automatically detect the location of a point of interest, such as a midpoint or other intermediate point on a surface, and to project light or another image onto such point of interest to indicate its location to a user. In accordance with certain aspects of an embodiment of the invention, the device includes remote distance measurement devices, such as laser distance measurement devices, that measure the distance to, for example, corners of a wall surface, and a digital protractor that measures the angle between the two remote distance measurement devices. Based on those measurements, a processor calculates the location of a predesignated point of interest, such as a midpoint or other intermediate point between the two wall corners, and projects a light or other image toward the location of such midpoint or other intermediate point to indicate such location to a user.

10 Claims, 5 Drawing Sheets

(56) References Cited

U.S. PATENT DOCUMENTS

| | | | |
|---|---|---|---|
| 2006/0259269 A1* | 11/2006 | Binder | B25H 7/00 |
| | | | 702/155 |
| 2009/0296072 A1* | 12/2009 | Kang | G01C 3/10 |
| | | | 356/18 |
| 2011/0288816 A1* | 11/2011 | Thierman | G01C 15/002 |
| | | | 702/159 |
| 2013/0167384 A1* | 7/2013 | Olexa | G01B 11/14 |
| | | | 33/227 |
| 2014/0016114 A1* | 1/2014 | Lopez | G01S 17/46 |
| | | | 356/138 |
| 2020/0065432 A1* | 2/2020 | Möller | G01C 1/04 |

* cited by examiner

POINT DETERMINATION AND PROJECTION DEVICE

CROSS REFERENCE TO RELATED APPLICATION

This application is a continuation of U.S. Non-provisional application Ser. No. 16/165,652 titled Point Determination and Projection Device," filed Oct. 19, 2018, now U.S. Pat. No. 10,969,223, which claims the benefit of U.S. Provisional Application No. 62/574,508 titled "Point Determination and Projection Device," filed Oct. 19, 2017 by the inventors herein, which application is incorporated herein by reference in its entirety.

FIELD OF THE INVENTION

This invention relates generally to measurement devices, and more particularly to a portable device for remotely determining and projecting the location of one or more calculated points of interest on a surface located between two other points of interest, such as a midpoint or other intermediate points between two corners or other features in a building space.

BACKGROUND OF THE INVENTION

A wide variety of devices have long been available for aiding in the measurement of various distances, including rulers, tape measurers, laser distance meters, and the like, all of which may be used to measure a straight-line distance between two given points in space. Other devices may likewise be used for measuring angles between points, such as both manual and digital protractors. In each case, a user operates the device by fixing it at a first point from which the user proposes to measure, and extending the opposite end of the measurement device to the opposite point to which they are measuring.

In some situations, however, it may be quite difficult to use such straight-line measurement devices, such as when attempting to measure the distance between two features or the dimensions of features that do not have clearly defined borders or edges.

By way of non-limiting example, in various construction and space planning applications it may be desirable to determine and display the midpoint or such other point of interest, such as a one-third-point, a one-quarter-point, etc. of a feature, such as a wall. While a planner might use prior known, straight-line measurement devices to determine the overall length between the endpoints of the wall, then calculate the midpoint or other intermediate point of interest of that measurement, and then re-measure from one of the endpoints to mark or otherwise denote the location of that calculated point of interest, this process is more difficult in cases where obstructions or oddly shaped corners do not yield clearly defined endpoints.

Thus, there remains a need in the art for a measurement device allowing the easy determination and indication of a point (or line) of interest between two points in space, such as the determination and indication of a midpoint (or midline) between two endpoints of a wall or other surface. Moreover, there remains a need in the art for such a measurement device that is portable and that may be used from a stationary point in space so as to avoid the need of the user to manually move from location to location to collect measurements.

SUMMARY OF THE INVENTION

Disclosed herein are devices and methods configured to address one or more of the above described disadvantages of the prior art. However, achieving the above purposes and/or benefits is not a necessary feature to each of the exemplary embodiments, and the claims herein may recite subject matter that does not achieve the above stated purposes.

Disclosed herein is a point determination and projection device configured to automatically detect the location of a point of interest, such as a midpoint or other calculated intermediate point on a surface, and to project light or another image onto such point of interest to indicate its location to a user. In accordance with certain aspects of an embodiment of the invention, the device includes remote distance measurement devices, such as laser distance measurement devices, that measure the distance to, for example, corners of a wall surface, and a digital protractor that measures the angle between the two remote distance measurement devices. Based on those measurements, a processor calculates the location of a predesignated point of interest, such as a midpoint between the two wall corners, and projects a light or other image toward the location of such midpoint to indicate such location to a user. In a particularly preferred embodiment, the point determination and projection device may detect and display such midpoint or other intermediate point of interest even for walls or other structures that have abnormal or uneven terminal edges. Further, in certain configurations, multiple calculated intermediate points of interest (e.g., lines at every one-third-point along the surface) may simultaneously be displayed by the point determination and projection device.

In accordance with certain aspects of an embodiment of the invention, a point determination and projection device is provided, comprising: at least one angularly adjustable, remote distance measurement device; a digital protractor operably engaging the at least one remote distance measurement device; and a processor having computer executable code stored thereon configured to: receive from the at least one remote distance measurement device a first distance measurement to a first point of interest; receive from the at least one remote distance measurement device a second distance measurement to a second point of interest; receive from the digital protractor an angle measurement of an angle having a vertex at the point determination and projection device and endpoints at the first point of interest and the second point of interest; calculate a location of a targeted point of interest between the first point of interest and the second point of interest; and generate human discernable output indicative of a location of the targeted point of interest.

In accordance with further aspects of an embodiment of the invention, a point determination and projection device is provided, comprising: a first angularly adjustable remote distance measurement device; a second angularly adjustable remote distance measurement device; an angularly adjustable remote light projection device; and a processor having computer executable code stored thereon configured to: receive from the first remote distance measurement device a first distance measurement to a first point of interest; receive from the second remote distance measurement device a second distance measurement to a second point of interest; determine an angle between the first distance measurement and the second distance measurement; calculate a location of a targeted point of interest between the first point of interest and the second point of interest; and generate human discernable output indicative of a location of the targeted point of interest.

BRIEF DESCRIPTION OF THE DRAWINGS

The accompanying drawings, which are included to provide further understanding of the invention and are incorporated in and constitute a part of this specification, illustrate embodiments of the present invention and together with the below description, serve to explain the principles of the invention.

DETAILED DESCRIPTION OF THE INVENTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form. Descriptions of well-known functions and structures are omitted to enhance clarity and conciseness.

Hereinafter, an apparatus and method for enabling the determination and display of the calculated location of a midpoint on a wall or other surface is disclosed. Embodiments of the invention may, however, be configured in many different forms for various other procedures (e.g., for purposes of calculating and displaying the location of other intermediate points of interest on a surface other than the midpoint) and should not be construed as limited to the exemplary embodiments set forth herein. Rather, these exemplary embodiments are provided so that this disclosure is thorough, and will fully convey the scope of the invention to those skilled in the art.

Throughout the drawings and the detailed description, unless otherwise described, the same drawing reference numerals are understood to refer to the same elements, features, and structures. The relative size and depiction of these elements may be exaggerated for clarity.

It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Further, it will be understood that when an element is referred to as being "connected to" another element, it can be directly connected to the other element, or intervening elements may be present.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first," "second," and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
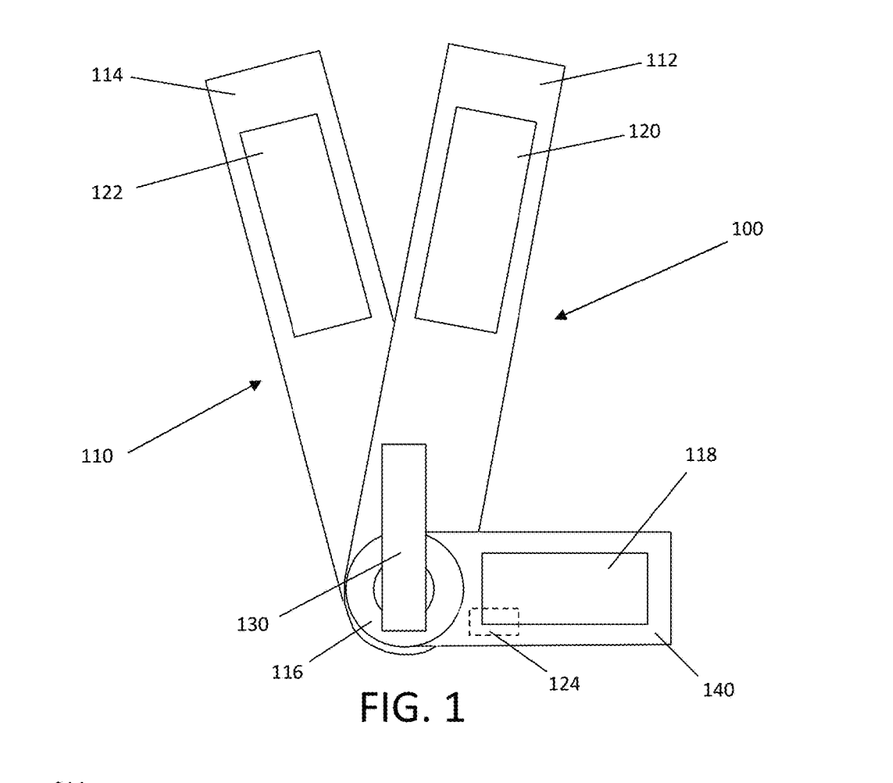
FIG. 1 is a top view of a point determination and projection device in accordance with certain aspects of an embodiment of the invention.

FIG. 1 is a schematic view of a point determination and projection device 100 in accordance with certain aspects of an embodiment of the invention. Point determination and projection device 100 includes a pivotable distance measurement device 110 having a first carrier arm 112 and a second carrier arm 114. First carrier arm 112 is pivotably mounted to second carrier arm 114 at pivotable mount 116, allowing arms 112 and 114 to open and close with respect to pivotable mount 116. Moreover, pivotable mount 116 comprises the vertex of a digital protractor that is configured to measure an angle between arms 112 and 114 and provide digital output indicative of the measured angle. Such digital protractor components are of well-known configuration to persons of ordinary skill in the art, and are readily commercially available (such as the TS02 Digital Angle Finder that is commercially available from General Tools), such that the specific construction of such pivotable mount is not further detailed here. Likewise, such digital protractors are readily able to communicate with a display, such as a digital display 118 mounted on a processor housing 140, to display to a user the value of the measured angle between first carrier arm 112 and second carrier arm 114.

Point determination and projection device 100 also includes a first remote distance measurement device, such as a laser distance measurement device 120, mounted on first carrier arm 112 and aligned with a longitudinal, central axis of first carrier arm 112, and a second remote distance measurement device, such as a second laser distance measurement device 122 mounted on second carrier arm 114 and aligned with a longitudinal, central axis of second carrier arm 114. Each such laser distance measurement device is configured to measure the distance from point determination and projection device 100, and more particularly from the vertex of the angle formed by first carrier arm 112 and second carrier arm 114, to a particular point of interest as discussed in greater detail below. Such laser distance measurement devices are of known configuration to persons of ordinary skill in the art and are readily commercially available (such as the GLM 15 from Bosch), such that their specific construction is not further detailed here. Likewise, such laser distance measurement devices are readily able to communicate with a display, such as a digital display 118, to display to a user the value of the measured distance from the respective laser distance measurement device and a point of interest.

In use, first carrier arm 112 can be directed toward a first feature of interest, such as a first corner of a wall for which a user wishes to determine a midpoint, and second carrier arm 114 can be directed toward a second feature of interest, such as a second corner of that wall. Laser light emitted from each of first laser distance measurement device 120 and second laser distance measurement device 122 can be used as guides to aid a user in properly aiming the central axis of each of first carrier arm 112 and second carrier arm 114 to their respective features of interest so as to properly measure an angle between them (from the vertex of point determination and projection device 100). With first carrier arm 112 and second carrier arm 114 so positioned, a user may capture the measured angle, and preferably store the value of such measured angle in data memory in communication with a processor, such as a processor 124 within processor housing 140. Likewise, a user may capture the distance from the vertex to each feature of interest from first laser distance measurement device 120 and second laser distance measurement device 122 (which may be calibrated to account for the additional distance between each such laser distance measurement device 120 and 122 and the vertex of point determination and projection device 100), and store such distance measurements in data memory. Push buttons, touch screen functions, or any other user-engageable feature may be provided to allow a user to collect such measurements after first carrier arm 112 and second carrier arm 114 have been properly positioned as explained above. Once such angle and distance measurements have been collected and stored in memory, the processor 124 may then use such data, as discussed in greater detail below with respect to the noted examples, to calculate a point of interest between the two features of interest, such as a midpoint on a wall between two corners defined by the ends of that wall.

Once that point of interest has been calculated, the location of such calculated point of interest may be displayed to the user. In an exemplary configuration, the calculated location of such point of interest may be displayed as a numeric value on digital display 118, such as a distance measurement from one of the corners to which first and second carrier arms 112 and 114 were directed. In another exemplary configuration, a light projection device 130, which may optionally comprise a laser distance measurement device of like configuration to first and second laser distance measurement devices 120 and 122, may be pivotably mounted to point determination and projection device 100. More particularly, with point determination and projection device 100 held in the same position as when the above-described measurements were taken, processor 124 may direct a pivoting mount for light projection device 130 (such as a servo motor) to pivot so as to align the projected light from light projection device 130 with the location of the calculated point of interest, thus illuminating the actual location of such point of interest for the user. Alternatively, light projection device 130 may be manually moveable by the user, and processor 124 may be configured to alert the user, such as by way of a signal light or audible tone emitted from processor housing 140, when the projected light from light projection device 130 is manually moved to an angle that causes such projected light to point to the calculated point of interest.

Optionally, light projection device 130 may include a laser line generator, the configuration of which is well known to persons of ordinary skill in the art, and readily commercially available (such as the VLM-650-28 Laser Module available from Quarton), such that its construction is not further detailed here. Thus, upon determination of the point of interest as discussed above, light projection device 130 may project a line, such as a vertical line, intersecting the location of the calculated point of interest, such as a midpoint location on a wall.

Figure 2:
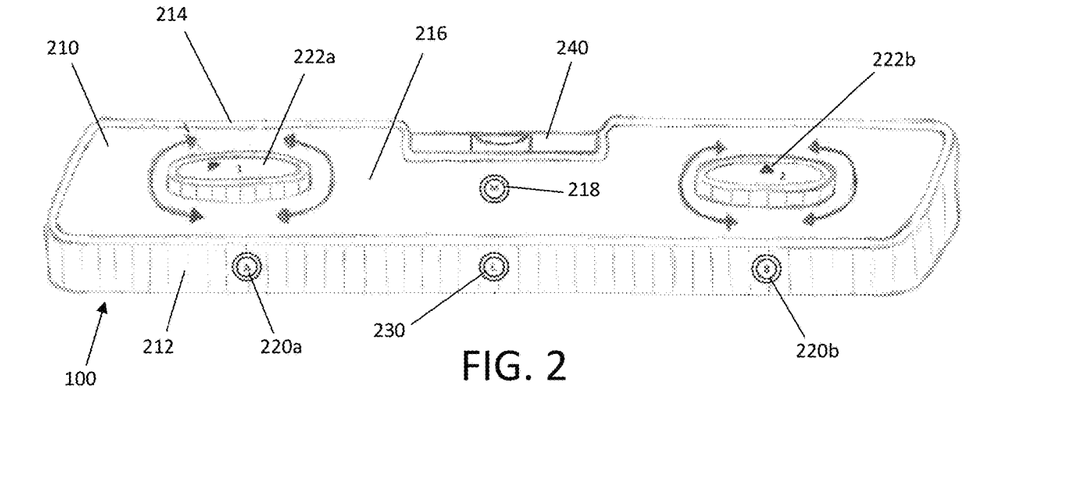
FIG. 2 is a front perspective view of a point determination and projection device in accordance with further aspects of an embodiment of the invention.

While FIG. 1 shows a schematic view of a point determination and projection device 100 in accordance with certain aspects of an embodiment of the invention, FIG. 2 shows a front perspective view of another configuration of point determination and projection device 100 in accordance with further aspects of an embodiment of the invention, which packages the foregoing components in a single housing for the same purposes as described above. More particularly, and with reference to FIG. 2, point determination and projection device 100 may include a housing 210 having a front edge 212, a back edge 214, and a top face 216. At least one pivotable laser distance measurement device is pivotably mounted within housing 210, and is positioned to project through front edge 212 of housing 210. Preferably, a first pivotable distance measurement device 220a is positioned between the center of housing 210 and a first side edge of housing 210, and a second pivotable distance measurement device 220b is positioned between the center of housing 210 and a second, opposite side edge of housing 210. Each pivotable distance measurement device 220a and 220b may comprise a compact, laser distance measurement device of standard configuration well-known to those of ordinary skill in the art and as described above with respect to FIG. 1. Further, each pivotable distance measurement device 220a and 220b is mounted within housing 210 for movement through an arc that is parallel to top face 216 of housing 210. In a particularly preferred configuration, control knobs 222a and 222b may be positioned on top face 216 of housing 210, and may engage each pivotable distance measurement device 220a and 220b, respectively, such that rotation of each control knob 222a and 222b causes pivoting movement of the respective distance measurement device 220a and 220b.

Preferably, either control knobs 222a and 222b or the internal, pivoting mounts for distance measurement devices 220a and 220b, include the same digital protractor configuration as pivotable mount 116 discussed above so as to detect the position, and more particularly the angle, at which distance measurement devices 220a and 220b are aligned with respect to housing 210. Such angular position sensors may transmit their angular position data to a processor within housing 210 that performs the same functions as processor 124 of FIG. 1. Such angular position sensors are readily adaptable to the instant point determination and projection device 100 by those of ordinary skill in the art to detect the current angle of distance measurement devices 220a and 220b with respect to housing 210.

In certain configurations, only a single distance measurement device 220 may be provided, with various angles of such single distance measurement device 220 being stored in local memory during measurement operations, as discussed in greater detail below.

Likewise, at least one pivotably mounted light projection device 230 (of like configuration to light projection device 130 of FIG. 1) is provided in housing 210, and is configured to project an image, such as a spot or line, onto a surface after the location of the point of interest (e.g., a midpoint between two endpoints of surface) has been calculated. Light projection device 230 is mounted within housing 210 for pivotable movement through an arc parallel to the movement of one or more distance measurement devices 220a and 220b, and may be automatically moveable (such as via an internally mounted servo motor, not shown), or manually moveable via an additional control knob (not shown) on housing 210, or alternatively through electronic controls on housing 210. As with distance measurement devices 220a and 220b, light projection device 230 likewise includes an angular position sensor that detects the position, and more particularly the angle, at which light projection device 230 is aligned with respect to housing 210. The angular position sensor of light projection device 230 likewise communicates with the processor, thus enabling the processor to direct light projection device 230 to aim at the calculated point of interest, or to confirm that light projection device 230 is aimed at the calculated point of interest. When such aiming point has been achieved, the processor may direct that light projection device 230 project its image to the calculated point of interest, or may signal a user (such as by lighting an LED or generating an audible tone) that such angle has been achieved.

In certain configurations, multiple calculated intermediate points of interest (e.g., lines at every one-third-point along the surface) may simultaneously be displayed by the point determination and projection device. More particularly, multiple light projection devices 230 configured as described above may optionally be provided in housing 210, each such light projection device 230 being independently pivotably mounted in housing 210 to project light, such as a vertical line, at a targeted intermediate point of interest.

Optionally, each of distance measurement devices 220a and 220b and light projection device 230 may be physically embodied in a single device, operable to both measure distances and project an image to the calculated point of interest as described herein, without departing from the spirit and scope of the invention.

As mentioned above, a processor (not shown) may be provided inside of housing 210, and may be in data communication with each of distance measurement devices 220a and 220b and light projection device 230, which processor is programmed to receive angular data from the angular position sensors that detect the angular position of distance measurement devices 220a and 220b, and of light projection device 230, to calculate a point of interest with respect to two endpoints (such as the midpoint between two endpoints of a structural feature such as a wall), and to determine the necessary angle of light projection device 230 with respect to housing 210 that is necessary to direct an image projected from light projection device 230 onto the structural feature at the calculated location of the point of interest. The processor may also be programmed to direct a drive signal to a servo motor in housing 210, if point determination and projection device 100 is equipped with such a servo motor to automatically pivot light projection device 230 to the calculated point of interest. More particularly and as further detailed below, the processor may be programmed to receive the angle and distance data from each distance measurement device 220a and 220b, calculate the location of a point of interest, such as a midpoint, between the points measured by distance measurement devices 220a and 220b, calculate a projection angle for light projection device 230, and either (i) send a control signal to a drive for light projection device 230 to move it to the calculated projection angle, or (ii) communicate with a drive mechanism for the light projection device 230 to determine when the projection device is aimed at the calculated projection angle, and thus at the calculated point of interest.

Optionally, housing 210 may include a bubble level situated along the back edge 214 of housing 210 to aid a user in maintaining the point determination and projection device 100 level during use. Likewise, housing 210 may optionally be provided a stand, or threaded receptacle to receive a threaded stand (such as a tripod), on the bottom face of housing 210 to aid a user in keeping the point determination and projection device 100 steady during use. As a further option, housing 210 may employ self-leveling devices as are known to persons skilled in the art and employed in such devices as the Model DW088K Self-leveling Cross Line Laser commercially available from DeWALT.

In use, point determination and projection device 100 is used to determine and display the location of a point of interest in relation to two measured points. In the exemplary embodiment described herein, the point determination and projection device 100 is described in relation to the calculation and display of the location of a midpoint between two endpoints of a surface, such as a wall surface in a building, including in those circumstances in which one or more of the endpoints are hidden. Those skilled in the art will recognize, however, that other points of interest (e.g., x % of the distance from a first endpoint to a second endpoint) could likewise be calculated and displayed through simple adjustment of the geometric formulas set forth herein without departing from the spirit and scope of the invention.

Figure 3:
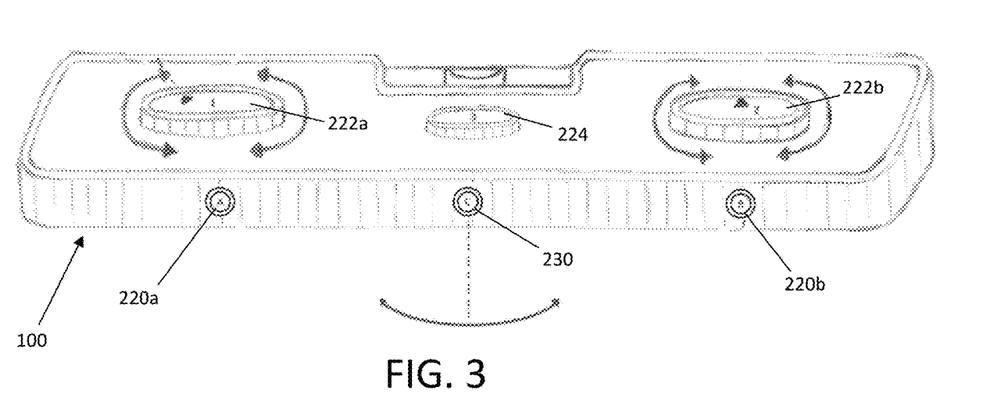
FIG. 3 is a front perspective view of a point determination and projection device in accordance with further aspects of an embodiment of the invention.

With reference to FIG. 3, when configured for manual intervention, a third control knob 224 may be provided at the middle of top face 216 of housing 210. Once the calculation is completed to project midpoint m, the user may be notified (e.g., by way of an audible tone or visual indicator, such as a light). The user then turns third control knob 224 until the angular position sensor on light projection device 230 determines that the calculated angle is reached. When the light projection device 230 reaches the calculated angle, the midpoint m will be projected onto the wall via the laser pointer of light projection device 230.

In order to obtain accurate calculations, point determination and projection device 100 should be positioned as follows:

a. The device should preferably be placed on a fixed, hard surface (e.g., a tabletop) or affixed to a stationary tripod of other support for stability.

b. The front of the device should be positioned approximately parallel to the wall or other surface being measured, although it need not be exactly parallel, as the calculations described below can account for when it is askew.

c. The lasers distance measurement devices and light projection device should have a clear line of sight to the wall or other surface being measured.

d. The dials of the device should face upwards.

e. The device should be horizontally level.

Figure 4:
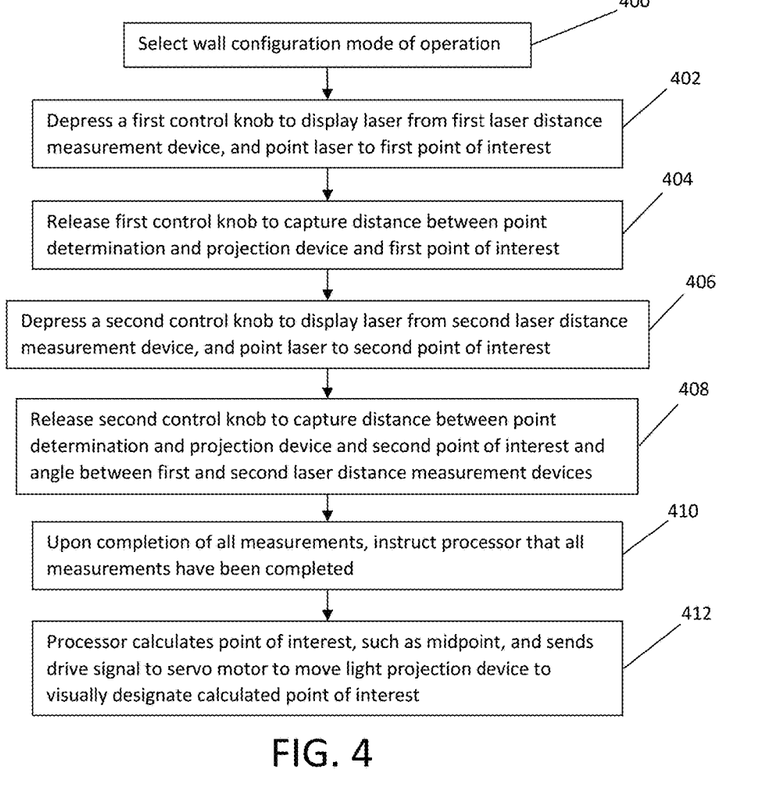
FIG. 4 is a schematic flow chart depicting a method for using a point determination and projection device in accordance with certain aspects of an embodiment of the invention.

After such positioning of point determination and projection device 100, operation may proceed as follows and as shown in FIG. 4. At a first step 400, a user may select a mode of operation (as detailed below) to instruct the processor to operate in one of multiple wall configuration modes that will establish the series of measurements and manipulations to be performed by point determination and projection device 100. Next, at step 402, the user depresses a first one of the control knobs, such as control knob 222a, and holds such control knob to display a laser point onto the surface that is to be measured, and turns the control knob 222a to point the laser distance measurement device at the first point of interest (such as a first corner of a wall whose midpoint is to be located). Next, at step 404, the user releases the first control knob 222a, which action instructs the processor to capture the distance between the vertex of the point determination and projection device and the first point of interest. Next, at step 406, the user depresses a second one of the control knobs, such as control knob 222b, and holds such control knob to display a laser point onto the surface that is to be measured, and turns the control knob 222b to point the laser distance measurement device at the second point of interest (such as a second corner of a wall whose midpoint is to be located). Next, at step 408, the user releases the second control knob 222b, which action instructs the processor to capture the distance between the vertex of the point determination and projection device and the second point of interest, as well as the angle between the first laser distance measurement device and the second laser distance measurement device. Next, at step 410, upon completion of all measurements of points of interest, a user depresses a capture button on point determination and projection device 100 to instruct the processor that all measurements have been completed. Finally, at step 412, the processor calculates the designated point of interest, such as the midpoint of a wall section that is undergoing examination, and sends a drive signal to the servo motor in point determination and projection device 100 to move light projection device 230 to visually designate the calculated point of interest.

Those skilled in the art will recognize that the ordering of steps in FIG. 4 are exemplary only, and that the steps may be varied in order of performance without departing from the spirit and scope of the invention.

The following description sets forth several scenarios in which the point determination and projection device 100 may be used to solve the specific problem of finding a midpoint. In each such exemplary implementation, we presume that the point determination and projection device 100 is perfectly level, such that all geometric calculations are being performed in a two-dimensional plane. The following notational conventions are used:

a. Upper case letters denote geometric points. Two distinguished points, M and P, represent the midpoint of a line segment and the location of the point determination and projection device 100, respectively.

b. The line segment described by two points, X and Y is denoted by $\overline{XY}$. Alternatively, lower case letters are used to name line segments.

c. The length of a line segment is denoted by the segment's termination points concatenated sans the overline. E.g., XY denotes the length of line segment $\overline{XY}$. Alternately, when the context is clear, the lower case name of a line segment is used to denote that segments lengths.

d. Greek letters denote geometric angles.

e. In the examples that follow and in the related figures (FIGS. 5A through 8):

(i) An open circle denotes a hidden corner.

(ii) The symbol  denotes a measurement.

(iii) The symbol  denotes a computed point/line projection.

Figure 5A:
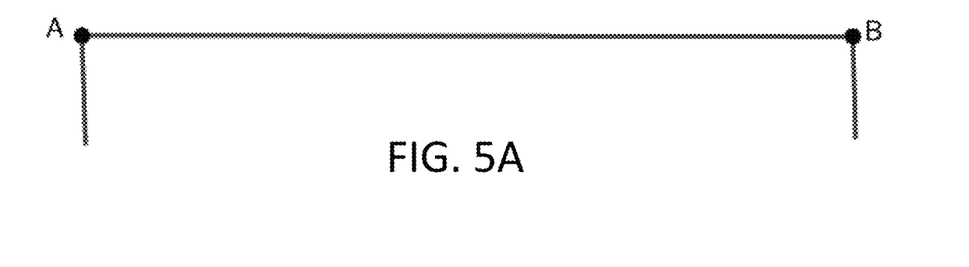
FIGS. 5A and 5B are schematic views of a structure with which a point determination and projection device may be used in a first mode of operation in accordance with certain aspects of an embodiment of the invention.
Figure 5B:
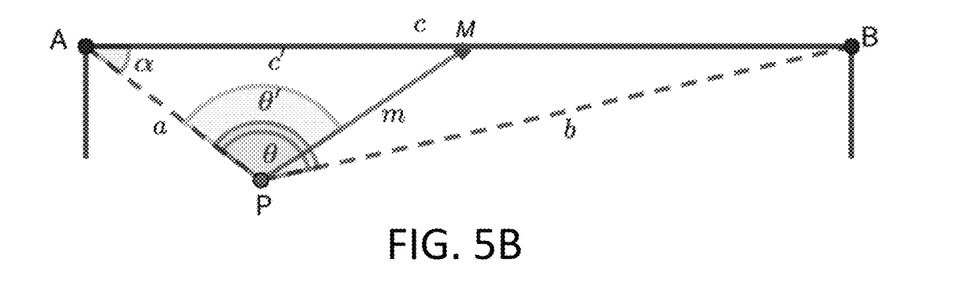

Example 1—Basic Flat Wall (FIG. 5A and FIG. 5B)

In this operational mode, the point determination and projection device 100 is used to evaluate a flat wall with no protrusions at any point along the wall. The corners of the wall (points A and B) are in clear line-of-sight, as shown in plan view in FIG. 5A. In this scenario, the point determination and projection device performs the following steps, illustrated in FIG. 5B:

a. Mode 1 (Basic Flat Wall) is selected by the user via a Mode button 218 on top face 216 of housing 210.

b. The right distance measurement device 220a is directed at the rightmost corner B of the wall by rotating the control knob 222a on the top of the device 100.

c. When the laser dot that is projected from distance measurement device 220a is displayed on the corner B of the wall, then the position of such endpoint is recorded, such as by depressing control knob 222a downward into housing 210.

d. The distance measurement device 220a that is directed via dial 222a is a measurement laser—therefore, at this point, the device has captured a measurement of the distance from the center of the device to the rightmost corner of the wall, i.e., the length of line segment b.

e. The left distance measurement device 220b is directed at the leftmost corner A of the wall by rotating the control knob 222b on the top of the device 100.

f. When the laser dot that is projected from distance measurement device 220b is displayed on the corner A of the wall, then the position of such endpoint is recorded, such as by depressing control knob 222b downward into housing 210.

g. The distance measurement device 220b that is directed via dial 222b is a measurement laser—therefore, at this point, the device has captured a measurement of the distance from the center of the device to the leftmost corner of the wall, i.e., the length of line segment a.

h. Using the processor, the device 100 automatically calculates the length of the wall by using the triangle that was created from 3 points: {A, P, B}, as discussed below. In this case, P is the center of the device, A is the left corner of the wall and B is the right corner of the wall.

i. The processor of device 100 automatically calculates the mid-point (M) of the wall, as discussed below.

j. A laser line is projected onto the mid-point of the wall (M) using light projection device 230, as shown in FIG. 5B.

The following formula is used by the processor to calculate mid-point (M). First, the length of line segments a and b are measured via distance measurement devices 220a and 220b. The angle Θ is then determined by the angle between the two lasers that are pointing to the corners of the wall. The processor is to calculate the length of line c. Ultimately, the processor will calculate the location of the mid-point of c, which is M.

$$c^2 = a^2 + b^2 - 2ab(\cos \Theta); AM = MB = c/2 \qquad \text{Equations:}$$

Example: If a=3, b=9 and Θ=100°
$c^2$=9+81−54 (−0.17365)
$c^2$=89−(−9.377)
$c^2$=98.377
c=9.918
AM=MB=c/2=4.959

With the distance from A (or B) to M calculated as above by the processor, the processor may then send a drive signal to the pivoting mount of light projection device 230 to move light projection device 230 to project a vertical line at the location of M.

In order to calculate the angle by which light projection device 230 is to be moved to in turn direct its light to the location of M (i.e., the midpoint or other calculated target point of interest between points A and B), given the measured values of the angles from device 100 to corners A and B, the distance from device 100 to corner A (such distance labeled a on FIG. 5B) and the calculated distance from corner A to point M, the processor may then readily calculate (i) the distance from device 100 to point m (such distance labeled a' on FIG. 5B), and thereafter (ii) the angle Θ' by which light projection device 230 is to be moved, both through application of the law of cosines as will readily occur to those of ordinary skill in the art, as follows.

a. With the known lengths of a, b and c, and the size of Θ, apply the law of cosines to calculate the size of angle α.
b. With the known lengths of a and c', and the size of the angle α, apply the law of cosines to calculate the length of m.
c. With the known lengths of m, a, and c', apply the law of cosines to calculate the size of angle Θ.

Figure 6A:
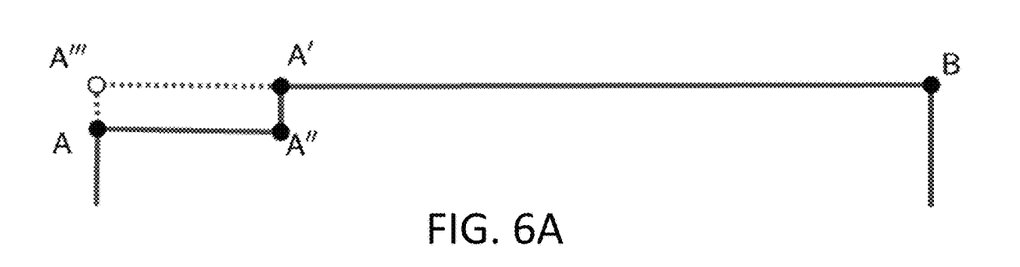
FIGS. 6A and 6B are schematic views of a structure with which a point determination and projection device may be used in a second mode of operation in accordance with certain aspects of an embodiment of the invention.
Figure 6B:
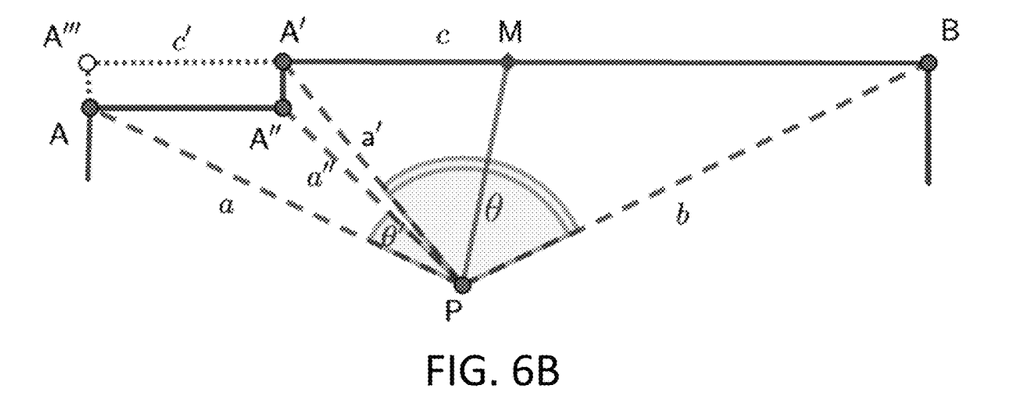

Example 2—One Corner with Rectilinear Protrusion (FIG. 6A and FIG. 6B)

In this operational mode, the point determination and projection device 100 is used to evaluate a mostly flat wall, except that one corner has a rectilinear protrusion as shown in FIG. 6A. All corners are in clear line-of-sight, as shown in plan view in FIG. 6A. In this scenario, the point determination and projection device 100 performs the following steps, illustrated in FIG. 6B:

a. Mode 2 (One Corner with Rectilinear Protrusion) is selected by the user via the Mode button 218.
b. Distance measurement device 220a is directed at the rightmost corner B of the wall by rotating the control knob 222a on the top of the device 100.
c. When the laser dot projected from distance measurement device 220a is displayed on the corner B of the wall, then control knob 222a is depressed to record the position.
d. The laser that is directed via distance measurement device 220a is a measurement laser—therefore, at this point, the device 100 has captured a measurement of the distance from the center of the device 100 to the rightmost corner B of the wall.
e. Distance measurement device 220b is directed at the leftmost corner of the protrusion on the left side of the wall A by rotating the control knob 222b on the top of the device 100.
f. When the laser dot projected from distance measurement device 220b is displayed on the corner A of the wall, then control knob 222b is depressed to record the position.
g. The laser that is directed via distance measurement device 220b is a measurement laser—therefore, at this point, the device 100 has captured a measurement of the distance from the center of the device 100 to corner A.
h. Distance measurement device 220b is now reused and directed at the rightmost corner of the protrusion on the left side of the wall A' by rotating control knob 222b on the top of the device 100.
i. When the laser dot projected from distance measurement device 220b is displayed on the corner A' of the wall, then control knob 220b is depressed to record the position.
j. The laser that is directed via distance measurement device 220b is a measurement laser—therefore, at this point, the device 100 has captured a measurement of the distance from the center of the device 100 to corner A'.
k. The processor of device 100 automatically calculates the virtual left corner of the wall A'" by using the two triangles that are created from {A, P, A'} and {A, A'", A'}. In this case, P is the center of the device, A is the leftmost corner of the protrusion, A' is the rightmost corner of the protrusion, and A'" is the virtual (hidden) left corner of the wall.
l. The processor of device 100 automatically calculates the length of the wall by using the triangle that was created from 3 points: {A'", P, B}. In this case, P is the center of the device, B is the right corner of the wall and A'" is the virtual (hidden) left corner of the wall.
m. The processor of device 100 automatically calculates the mid-point (M) of the wall.
n. A laser line is projected onto the mid-point of the wall (M) using light projection device 230.

The following formula is used by the processor to calculate mid-point (M). The length of lines a' and b are known (measured via laser distance). Likewise, the length of lines a and a" are known (measured via laser distance). The angle Θ is known, because it is measured by the angle between the two lasers that are pointing to A' and B. The angle Θ' is also known, because it is measured by the angle between the two lasers that are pointing to A and A". The length of c+c' is to be calculated by the processor. Ultimately, as shown in FIG. 6B, the processor will calculate the mid-point of the length of c plus the length of c', which is M.

Equations: Given a', b and Θ, the same calculations as set forth above with respect to Example 1 may be employed by the processor to calculate the length of c.

Given a, a" and Θ', the processor can also use the same calculations as Example 1 to calculate the length of c'.

$$A'''M=BM=(c+c')/2$$

Once again, with the location of midpoint M calculated as above by the processor, the processor may then move light projection device 230 to project a vertical line at the location of such calculated midpoint.

Example 3—One Corner with Freeform Protrusion (FIGS. 7A to 7E)

Figure 7A:
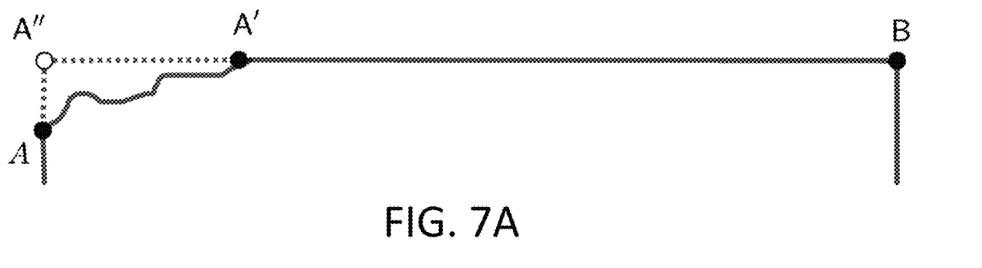
FIGS. 7A through 7E are schematic views of a structure with which a point determination and projection device may be used in a third mode of operation in accordance with certain aspects of an embodiment of the invention.

In this operational mode 3, the point determination and projection device 100 is used to evaluate a mostly flat wall, except that one end has a non-rectilinear protrusion (which could be a rounded column, or even a very odd shape) as shown in plan view in FIG. 7A. All corners are in clear line-of-sight.

As above, Mode 3 (One Corner with Freeform Protrusion) is selected by the user via the Mode Button 118, and measurements are collected as in Examples 1 and 2 above.

Thus, the length of lines a, b and a' are known (measured via laser distance); the angles Θ and Θ' are known, because they were measured by the angles between the lasers that are pointing to the corners of the wall for a, b and a'; the processor is to determine the length of lines c and c'; and ultimately, the processor will calculate the mid-point of c+c', which is M.

Equations: Given a', b and Θ, the processor can use the same calculations as Example 1 to calculate c.

Figure 7B:
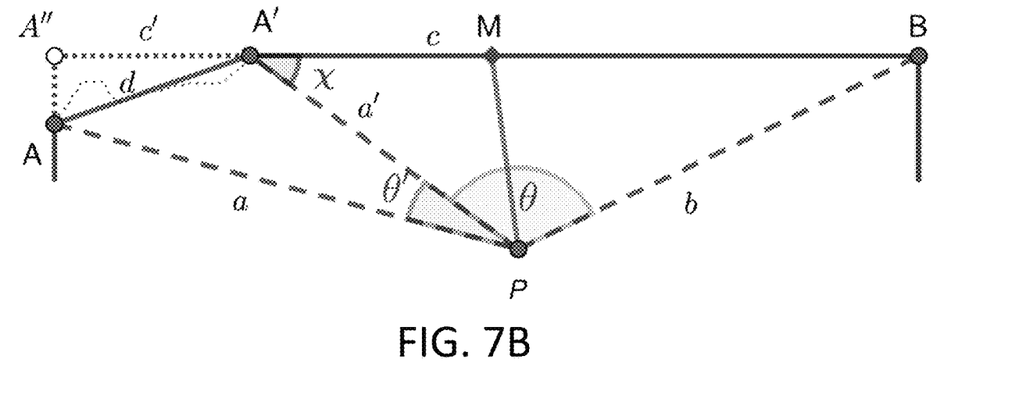
Figure 7C:
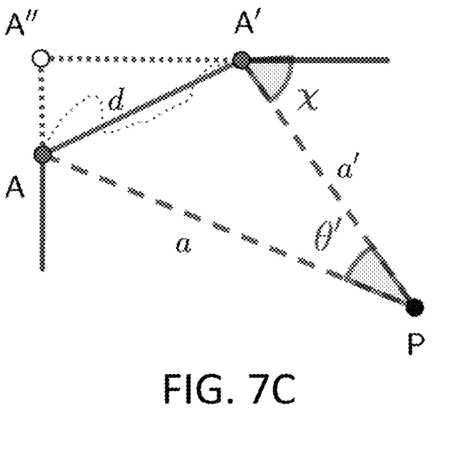
Figure 7D:
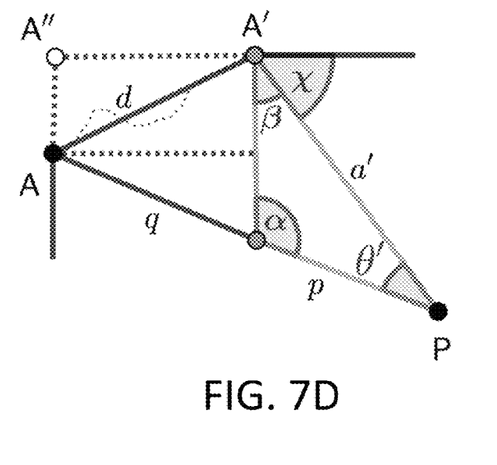

Given a, a' and Θ', the processor can also use the same calculations as Example 1 to calculate d, where edge d deviates from the path of c and meets at the end of c, as shown in FIG. 7B. At this point, d can be used to form a diagonal line that traverses an imaginary rectangle, as shown in FIG. 7D.

Next, the processor can solve for the lengths of the sides of two inner triangles since the angles of those triangles are easily determined. FIG. 7D shows the first inner triangle that is solved.

Because the angle χ is known, the processor can find angles β and α as follows:

$$\beta = 180 - 90 - \chi$$

$$\alpha = 180 - Y - \Theta'$$

The processor can now solve for p and q, as follows:

$$p/\sin(\beta) = a/\sin(\alpha)$$

$$q = a - p$$

Figure 7E:
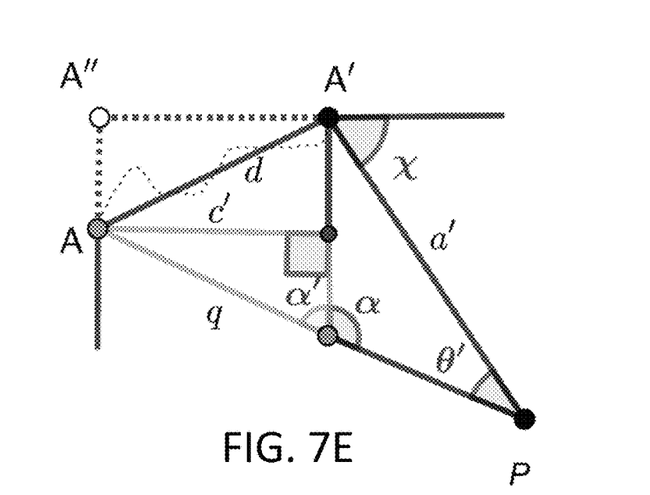

Finally, the processor can start to solve the second inner triangle, which will provide the length of edge c'. FIG. 7E shows the second inner triangle that is solved by the processor.

First, the angle α' must be determined, and then the processor can solve for c'. Both can be solved as follows:

$$\alpha' = 180 - \alpha$$

$$c'/\sin(\alpha') = q/\sin(90)$$

The location of M can be found as in the previous example:
A"M=BM=(c+c')/2
Once again, with the location of midpoint M calculated as above by the processor, the processor may then move light projection device 230 to project a vertical line at the location of such calculated midpoint.

Figure 8:
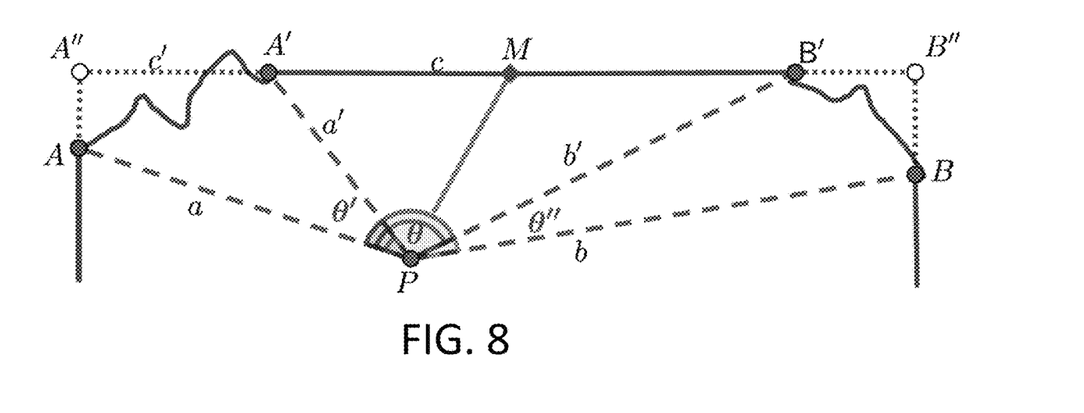
FIG. 8 is a schematic view of a structure with which a point determination and projection device may be used in a fourth mode of operation in accordance with certain aspects of an embodiment of the invention.

Example 4—Both Corners with Freeform Protrusions (FIG. 8A)

In this operational mode, the point determination and projection device 100 is used to evaluate a mostly flat wall, except that both ends have a non-rectilinear protrusion (which could be a rounded column or even a very odd shape) as shown in FIG. 8A. All other corners are in clear line-of-sight.

Once again, Mode 4 (Both Corners with Freeform Protrusions) is selected by the user via the Mode Button 118, and measurements are collected as in Examples 1 and 2 above.

As shown in FIG. 8, this scenario can be solved by the processor using the same mathematical equations as are set forth above with respect to Example 3.

Once angle Θ is determined for each of the Examples set forth above, the processor of point determination and projection device 100 can calculate the angle that is required to project the calculated midpoint M. As mentioned above, such projection of the midpoint may be carried out via manual intervention (e.g., the user turning an additional control knob), or electronically (e.g., using a digital protractor and servo motor).

Optionally, light projection device 230 may be configured to project and display a reference line, such as a vertical line, at the calculated point of interest, which reference line is perpendicular to the horizontal measurements of distance measurement devices 220a and 220b. Also optionally and as referenced above, the calculated point of interest may be at a location other than the midpoint between the two reference points, such as (by way of non-limiting example) 25% offset to one side. Further, point determination and projection device may be used to alternatively or additionally determine and project a vertical reference point, such as a vertical midpoint, using the same principles and operating mechanisms as have been described above. Still further, point determination and projection device 100 may include an auto-leveling function that may be operable by pointing distance measurement devices 120a and 120b at the top and bottom ends of the wall or other surface under examination as a calibration step.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A point determination and projection device, comprising:
   at least one angularly adjustable, remote distance measurement device;
   a digital protractor operably engaging said at least one remote distance measurement device; and
   a processor having computer executable code stored thereon configured to:
      measure distances to multiple points of interest in a first segment of a surface and calculate a first angle having a vertex at said point determination and projection device and endpoints at each of said multiple points of interest in said first segment;
      measure distances to multiple points of interest in a second segment of said surface and calculate a second angle having a vertex at said point determination and projection device and endpoints at each of said multiple points of interest in said second segment;
      calculate a location of a surface targeted point of interest based on a combination of said distances measured to multiple points of interest in said first and second segments and said first and second angles; and
      generate human discernable output indicative of a location of said surface targeted point of interest.

2. The point determination and projection device of claim 1, further comprising:
   an angularly adjustable remote light projection device;
   wherein said computer executable code is further configured to move said angularly adjustable remote light projection device to project light therefrom at said location of said targeted point of interest.

3. The point determination and projection device of claim 2, wherein said angularly adjustable remote light projection device is fixedly mounted to a servo controller that is in electrical communication with said processor.

4. The point determination and projection device of claim 1, wherein said at least one angularly adjustable, remote distance measurement device further comprises a first angularly adjustable laser distance measurement device and a second angularly adjustable laser distance measurement device.

5. The point determination and projection device of claim 4, further comprising:
an angularly adjustable remote light projection device;
wherein said executable code is further configured to move said angularly adjustable remote light projection device to project light therefrom at said location of said targeted point of interest.

6. The point determination and projection device of claim 5, further comprising a housing, wherein said angularly adjustable remote light projection device is positioned within said housing, said first angularly adjustable laser distance measurement device is positioned within said housing on a first side of said remote light projection device, and said second angularly adjustable laser distance measurement device is positioned within said housing on a second side of said remote light projection device that is opposite said first side.

7. The point determination and projection device of claim 4, further comprising:
a housing;
a first manually operable control knob positioned on a top face of said housing and mechanically engaging said first angularly adjustable remote light projection device; and
a second manually operable control knob positioned on said top face of said housing and mechanically engaging said second angularly adjustable remote light projection device.

8. The point determination and projection device of claim 7, further comprising a level configured to indicate to a user when said top face of said housing is level.

9. The point determination and projection device of claim 7, further comprising an internal self-leveling mechanism.

10. The point determination and projection device of claim 1, further comprising a mode selector in communication with said processor and configured to designate an operational mode that prompts a user to manipulate said at least one remote distance measurement device through a pre-designated number of measurements of points of interest.

* * * * *